(12) United States Patent
Woodhouse et al.

(10) Patent No.: US 10,899,466 B2
(45) Date of Patent: Jan. 26, 2021

(54) ELECTRICAL POWER SUPPLY ON A VEHICLE

(71) Applicant: BAE Systems plc, London (GB)

(72) Inventors: Gordon Charles Woodhouse, Preston (GB); Luke Michael Boston, Preston (GB)

(73) Assignee: BAE Systems plc, London (GB)

( * ) Notice: Subject to any disclaimer, the term of this patent is extended or adjusted under 35 U.S.C. 154(b) by 363 days.

(21) Appl. No.: 15/755,875

(22) PCT Filed: Aug. 26, 2016

(86) PCT No.: PCT/GB2016/052660
§ 371 (c)(1),
(2) Date: Feb. 27, 2018

(87) PCT Pub. No.: WO2017/037435
PCT Pub. Date: Mar. 9, 2017

(65) Prior Publication Data
US 2018/0244398 A1    Aug. 30, 2018

(30) Foreign Application Priority Data

Sep. 2, 2015    (GB) .................................. 1515542.7

(51) Int. Cl.
*H02J 7/34*    (2006.01)
*B64D 41/00*    (2006.01)
(Continued)

(52) U.S. Cl.
CPC .......... *B64D 41/00* (2013.01); *F02N 11/0862* (2013.01); *G08G 5/0039* (2013.01);
(Continued)

(58) Field of Classification Search
CPC ..... B64C 41/00; H02J 1/10; H02J 4/00; H02J 7/0063; H02J 2300/30; H02J 7/34;
(Continued)

(56) References Cited

U.S. PATENT DOCUMENTS

| | | | |
|---|---|---|---|
| 4,523,517 A | * | 6/1985 | Cronin .................. B64D 13/06 237/2 A |
| 5,020,317 A | | 6/1991 | McArthur |

(Continued)

FOREIGN PATENT DOCUMENTS

| | | |
|---|---|---|
| EP | 2275346 A2 | 1/2011 |
| EP | 2387123 A2 | 11/2011 |

(Continued)

OTHER PUBLICATIONS

Combined Search and Examination Report under Sections 17 and 18(3) of Great Britain Application No. GB1614567.4, dated Jan. 25, 2017, 5 pages.

(Continued)

*Primary Examiner* — McDieunel Marc
(74) *Attorney, Agent, or Firm* — Maine Cernota & Rardin (57) ABSTRACT

A vehicle comprising: an engine; an engine driven electrical power generator configured to be driven by the engine; a fuel cell; one or more vehicle subsystems; a memory storing a plurality of different power sharing templates, each power sharing template specifying different power supply sharing information; and a controller configured to: select a power sharing template from the plurality of power sharing templates; and control the engine driven electrical power generator and the fuel cell to supply electrical power to the one or more vehicle subsystems such that said supply of electrical power is proportioned between the engine driven electrical power generator and the fuel cell in accordance (Continued)

with the power supply sharing information specified in the selected power sharing template.

13 Claims, 7 Drawing Sheets

(51) Int. Cl.
| | | |
|---|---|---|
| *H02J 1/10* | (2006.01) | |
| *F02N 11/08* | (2006.01) | |
| *G08G 5/00* | (2006.01) | |
| *H02J 4/00* | (2006.01) | |
| *H02J 7/00* | (2006.01) | |
| *F02C 7/275* | (2006.01) | |

(52) U.S. Cl.
CPC ............... *H02J 1/10* (2013.01); *H02J 4/00* (2013.01); *H02J 7/0063* (2013.01); *B64D 2041/005* (2013.01); *F02C 7/275* (2013.01); *F02N 2200/02* (2013.01); *F05D 2270/09* (2013.01); *H02J 7/34* (2013.01); *H02J 7/345* (2013.01); *H02J 2300/30* (2020.01); *Y02T 50/40* (2013.01); *Y02T 50/50* (2013.01); *Y02T 90/40* (2013.01)

(58) Field of Classification Search
CPC ............... H02J 7/345; B64D 2041/005; B64D 2211/00; B64D 27/24; B64D 2221/00; G08G 5/0039; F02N 11/0862; F02N 2200/02; F02C 7/275; F05D 1170/09; Y02T 50/44; Y02T 50/54; Y02T 50/36; Y02T 50/62; Y02T 90/32; Y02T 90/36; Y02T 10/7005; Y02T 10/7044; Y02T 10/7275; Y02T 90/34; Y02T 10/7022; H01M 2250/20; H01M 8/04753; H01M 8/04761; Y10T 307/516
See application file for complete search history.

(56) References Cited

U.S. PATENT DOCUMENTS

| | | | | |
|---|---|---|---|---|
| 5,823,468 | A * | 10/1998 | Bothe | B64B 1/08 244/2 |
| 6,124,646 | A * | 9/2000 | Artinian | B64D 13/06 290/52 |
| 7,076,335 | B2 * | 7/2006 | Seemann | B62D 55/00 700/248 |
| 7,898,789 | B1 * | 3/2011 | Jarvinen | B64D 27/24 361/218 |
| 8,260,522 | B2 * | 9/2012 | Botura | H02J 4/00 701/99 |
| 8,543,264 | B1 | 9/2013 | Tomas | |
| 2002/0128759 | A1 | 9/2002 | Sodoski | |
| 2003/0205641 | A1 * | 11/2003 | McElroy | B64C 39/024 244/53 R |
| 2003/0207164 | A1 * | 11/2003 | McElroy | H01M 8/186 244/30 |
| 2008/0058998 | A1 | 3/2008 | Breit | |
| 2008/0150356 | A1 | 6/2008 | Boeing | |
| 2009/0306836 | A1 | 12/2009 | Ausman et al. | |
| 2011/0210606 | A1 | 9/2011 | Selker | |
| 2012/0161512 | A1 | 6/2012 | Metzler | |
| 2012/0318914 | A1 | 12/2012 | Rajashekara | |
| 2013/0099560 | A1 | 4/2013 | Shipley et al. | |
| 2013/0110382 | A1 | 5/2013 | Ishikawa et al. | |
| 2013/0219905 | A1 | 8/2013 | Marconi | |
| 2014/0054411 | A1 | 2/2014 | Connaulte et al. | |
| 2014/0084817 | A1 * | 3/2014 | Bhavaraju | H02P 3/14 318/139 |
| 2014/0303871 | A1 | 10/2014 | Presse | |
| 2015/0148994 | A1 | 5/2015 | Nagashima | |

FOREIGN PATENT DOCUMENTS

| | | |
|---|---|---|
| GB | 2491982 A | 12/2012 |
| WO | 20130124852 A1 | 8/2013 |
| WO | 2015034532 A1 | 3/2015 |
| WO | 2015101978 A1 | 7/2015 |

OTHER PUBLICATIONS

International Search Report and Written Opinion of International Application No. PCT/GB2016/052658, dated Oct. 26, 2016, 14 pages.
"1978 Cessna 172N Skyhawk Pilot's Operating handbook", Jan. 1, 1977, XP055313879, Wichita, Kansas USA, Retrieved from: Url:https//www.flyingd.net/documents/N739EF_172N_POH_000.pdf.
Search Report under Section 17(5) of Great Britain Application No. GB1515540.1, dated Feb. 16, 2016, 3 pages.
International Search Report and Written Opinion of International Application No. PCT/GB2016/052660, dated Nov. 3, 2016, 14 pages.
Search Report under Section 17(5) of Great Britain Application No. GB1515542.7, dated Feb. 16, 2016, 3 pgaes.
Combined Search and Examination Report under Sections 17 and 18(3) of Great Britain Application No. GB1614572.4, dated Jan. 26, 2017, 6 pages.
International Preliminary Report on Patentability of International Application No. PCTGB2016052660, dated Mar. 6, 2018, 10 pages.

* cited by examiner

ELECTRICAL POWER SUPPLY ON A VEHICLE

RELATED APPLICATIONS

This application is a national phase application filed under 35 USC § 371 of PCT Application No. PCT/GB2016/052660 with an International filing date of Aug. 26, 2016 which claims priority of GB Patent Application 1515542.7 filed Sep. 2, 2015. Each of these applications is herein incorporated by reference in its entirety for all purposes.

FIELD OF THE INVENTION

The present invention relates to vehicles having on board electrical power supplies and the supplying of electrical power to subsystems of those vehicles by the on board electrical power supplies.

BACKGROUND

Many aircraft comprise an aircraft electrical system. The aircraft electrical systems of different aircraft may differ greatly from one another. However, typically, an aircraft electrical system comprises a self-contained network of components that generate, distribute, utilise and store electrical energy.

The components of aircraft electrical systems that generate electrical power are generally driven by the aircraft engine, although electricity generators that are powered in a different way are known.

Engine faults, for example engine failures, can occur on an aircraft in flight.

SUMMARY OF THE INVENTION

In a first aspect, the present invention provides a vehicle comprising an engine, an engine driven electrical power generator configured to be driven by the engine, a fuel cell, one or more vehicle subsystems, and a controller configured to control the engine driven electrical power generator and the fuel cell to supply electrical power to the one or more vehicle subsystems.

The controller may be configured to determine that an electrical power demand of the one or more vehicle subsystems exceeds an electrical power output of the engine driven electrical power generator. The controller may be configured to, responsive to determining that the electrical power demand of the one or more vehicle subsystems exceeds the electrical power output of the engine driven electrical power generator, control the fuel cell to increase the electrical power supplied to the one or more vehicle subsystems by the fuel cell.

The controller may be configured to determine a current operation phase for the vehicle from a plurality of different possible operation phases. The controller may be configured to control the engine driven electrical power generator and the fuel cell to supply electrical power to the one or more vehicle subsystems based on the current operation phase.

The vehicle may be an aircraft. The operation phases may be flight phases or mission phases for the aircraft.

The vehicle may further comprise a memory storing a plurality of power sharing templates. Each power sharing template may specify power supply sharing information. Each power sharing template may correspond to a respective operation phase. The controller may be configured to select, from the plurality of power sharing templates, the power sharing template corresponding to the determined current operation phase for the vehicle. The controller may be configured to control the engine driven electrical power generator and the fuel cell such that the electrical power supplied to the one or more vehicle subsystems by the engine driven electrical power generator and the fuel cell is proportioned between the engine driven electrical power generator and the fuel cell in accordance with the power supply sharing information specified in the selected power sharing template.

The controller may be configured to, responsive to responsive to detecting an event, override the selected power sharing template and control the engine driven electrical power generator and the fuel cell to supply electrical power to the one or more vehicle subsystems such that said supply of electrical power is proportioned between the engine driven electrical power generator and the fuel cell differently to that specified in the selected power sharing template.

The controller may be configured to, responsive to detecting an event, control the fuel cell to increase an amount of electrical power supplied to the one or more vehicle subsystems by the fuel cell.

The vehicle may further comprise an energy storage device, the energy storage device being independent from the fuel cell and the engine driven electrical power generator. The controller may be configured to, responsive to detecting an event, control the energy storage device to discharge and supply at least some electrical power to the one or more vehicle subsystems.

The energy storage device may be an energy storage device selected from the group of energy storage devices consisting of a battery and a supercapacitor.

The controller may be configured to, responsive to detecting an event, control the energy storage device to discharge and supply electrical power to the one or more vehicle subsystems while (e.g. only while) an electrical power output of the fuel cell is increasing. The event may be an event selected from the group of events consisting of: the controller acquiring an indication that a fault with the engine has occurred; the controller acquiring an indication that an electrical power demand of the one or more vehicle subsystems has increased; the controller acquiring an indication that an electrical power demand of the one or more vehicle subsystems will increase at a future time step; and the controller acquiring an indication that an electrical power demand of the one or more vehicle subsystems exceeds an electrical power output of the engine driven electrical power generator.

The vehicle may further comprise a fault detection module. The controller may be configured to, responsive to the fault detection module detecting a fault occurring with the engine, control the fuel cell to provide an increased level of electrical power to the one or more vehicle subsystems.

The vehicle may further comprise a system for starting the engine. The controller may be configured to, responsive to the fault detection module detecting a fault occurring with the engine, control the fuel cell to provide electrical power to the system for starting the engine, and control the system for starting the engine to attempt to start the engine using the supplied electrical power.

The fuel cell may be a fuel cell selected from the group of fuel cells consisting of a Proton Exchange Membrane fuel cell and a Solid Oxide Fuel Cell.

The vehicle may be an aircraft.

In a further aspect, the present invention provides a method for generating electrical power on a vehicle. The method comprises: providing, on the vehicle, an engine driven electrical power generator configured to be driven by an engine of the vehicle; providing, on the vehicle, a fuel cell; and controlling the engine driven electrical power generator and the fuel cell to supply electrical power to one or more vehicle subsystems located on the vehicle.

DETAILED DESCRIPTION

Figure 1:
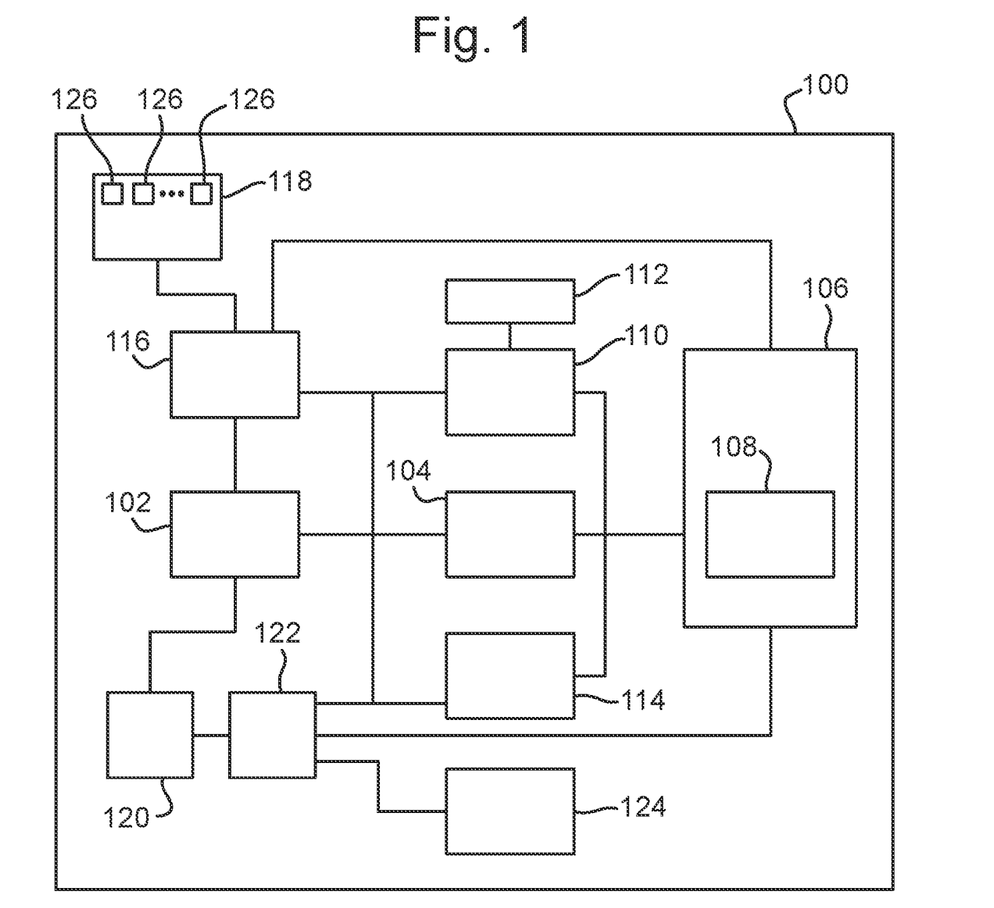
FIG. 1 is a schematic illustration (not to scale) of an aircraft.

FIG. 1 is a schematic illustration (not to scale) of an aircraft 100.

In this embodiment, the aircraft 100 is an unmanned autonomous aircraft. However, in other embodiments, the aircraft 100 is a manned and/or non-autonomous aircraft.

In this embodiment, the aircraft 100 comprises an engine 102, an engine driven power generator 104, aircraft subsystems 106 including aircraft control surfaces 108, a fuel cell 110, a fuel cell fuel supply 112, a battery 114, a power sharing module 116, a power sharing template store 118, a fault detection module 120, an aircraft control module 122, and aircraft sensor systems 124.

The engine 102 generates mechanical power for the aircraft 100. The engine 102 may be any appropriate type of aircraft engine such as a jet engine that uses jet fuel to generate propulsion and thrust for the aircraft 100. In this embodiment, there is only a single engine on the aircraft 100. The engine 102 is coupled to the engine driven power generator 104 such that the engine 102 drives the engine driven power generator 104.

The engine driven power generator 104 is an electrical power generator that is driven by the engine 102 to produce electrical power. The engine driven power generator 104 is coupled to the aircraft subsystems 106 such that electrical power generated by the engine driven power generator 104 may be provided for use by the aircraft subsystems 106. The engine driven power generator 104 is coupled to the battery 114 such that excess electrical power generated by the engine driven power generator 104 may charge or recharge the battery 114.

The aircraft subsystems 106 include systems on board the aircraft 106 that utilise electrical power. In this embodiment, the aircraft subsystems 106 include the aircraft control surfaces 108. The aircraft subsystems 106 may include any appropriate aircraft systems that use electrical power including, but not limited to, electrical icing protection, landing gear, braking doors, fuel pumping, electrical heating and/or cooling systems, and electrical engine ancillaries. In some embodiments, for example embodiments in which the aircraft 100 is manned, the aircraft subsystems 106 may include electrical environmental control systems, cabin pressurisation, and air conditioning.

The aircraft control surfaces 108 are surfaces on board the aircraft 100 that may be controlled to control the flight attitude of the aircraft 100. In this embodiment, the flight control surfaces 108 are electrically actuated. In some embodiments, the flight control surfaces may be controlled electrically and hydraulically.

The fuel cell 110 is a device that converts a fuel cell fuel into electricity through a chemical reaction. The fuel cell 110 is described in more detail later below with reference to FIG. 2. In this embodiment, the fuel cell 110 is coupled to the fuel supply 112 such that the fuel cell 110 may receive fuel cell fuel stored by the fuel supply 112 for conversion into electricity.

In this embodiment, the fuel cell fuel is hydrogen. In some embodiments, the fuel cell fuel supply 112 is a store of hydrogen, which may be in gas or liquid form. In some embodiments, the fuel cell fuel supply uses a process of jet fuel reforming to convert the aircraft fuel on-board the aircraft for use by the engine into hydrogen that may be used by the fuel cell 110.

The fuel cell 110 is further coupled to the aircraft subsystems 106 such that electrical power generated by the fuel cell 110 may be provided for use by the aircraft subsystems 106. The fuel cell 110 is coupled to the battery 114 such that excess electrical power generated by the fuel cell 110 may charge or recharge the battery 114. The fuel cell 110 is coupled to the engine 102 such that electrical power generated by the fuel cell 110 may be provided for use by the engine 102, for example, to start the engine 102, e.g. by powering an electric motor to turn the engine 102.

The battery 114 is a rechargeable battery. The battery 114 stores chemical energy and is configured to convert that stored chemical energy into electrical energy. The battery 114 may be any appropriate type of battery including, but not limited to, a lead acid battery, a nickel-cadmium (Ni-Cad) battery, a lithium-ion (Li-ion) battery, a thermal battery, and a structural or conformal battery. The battery 114 is coupled to the aircraft subsystems 106 such that electrical power generated by the battery 114 may be provided for use by the aircraft subsystems 106. The battery 114 is coupled to the engine 102 such that electrical power generated by the battery 114 may be provided for use by the engine 102, for example, to start the engine 102, e.g. by powering an electric motor to turn the engine 102, or starting an auxiliary power unit (APU) which in turn starts the engine 102.

The power sharing module 116 comprises one or more processors. The power sharing module 116 is coupled to the aircraft subsystems 106 and the engine 102 such that measurements of parameters associated with the aircraft subsystems 106 and/or the engine 102 may be taken by the power sharing module 116, for example, the power sharing module 116 may measure or determine in some other way an electrical power level demanded by the aircraft subsystems 106 and/or the engine 102. The power sharing module 116 is coupled to the fuel cell 100 such that the power sharing module 116 may control operation of the fuel cell 110, for example, to increase or decrease the electrical power generated by the fuel cell 110. The power sharing module 116 is coupled to the engine driven power generator 104 such that the power sharing module 116 may control operation of the engine driven power generator 104, for example, to increase or decrease the electrical power generated by the engine driven power generator 104. The power sharing module 116 is coupled to the battery 114 such that the power sharing module 116 may control operation of the battery 114, for example, to increase or decrease the electrical power output by the engine battery 114. The power sharing module 116 is configured to control the engine driven power generator 104, the fuel cell 110, and the battery 114 so as to change the proportions of the total generated electrical power (i.e. the total power produced by the engine driven power generator 104, the fuel cell 110, and the battery 114) that those individual systems produce. The power sharing module 116 is coupled to the power sharing template store 118 such that a power sharing template 126 stored by the power sharing template store 118 may be retrieved by the power sharing module 116. Control of the engine driven power generator 104, the fuel cell 110, and/or the battery 114 by the power sharing module 116 may depend on measurements of the aircraft subsystems 106 and/or the engine 102. Control of the engine driven power generator 104, the fuel cell 110, and/or the battery 114 by the power sharing module 116 may depend on a template 126 retrieved from the power sharing template store 118. The power sharing module 116 may be powered by electrical power supplied by the engine driven power generator 104, the fuel cell 110, and/or the battery 114.

The power sharing template store 118 is computer memory storing a plurality of power sharing templates 126. Preferably the power sharing template store 118 is a rewritable memory, thereby allowing for the addition, removal, and updating of the templates 126 stored thereon. Preferably the power sharing template store 118 is a non-volatile memory, thereby providing that the templates 126 are retained even when the power sharing template store 118 is not powered. The power sharing template store 118 may be powered by electrical power supplied by the engine driven power generator 104, the fuel cell 110, and/or the battery 114.

In this embodiment, each power sharing template 126 corresponds to a respective different aircraft flight phase. Examples of aircraft flight phases include, but are not limited to a "ground phase" in which the aircraft 100 is grounded, a "take-off phase" in which the aircraft 100 is taking off, a "climb phase" in which the aircraft 100 is climbing in altitude, "a cruise phase" in which the aircraft 100 is cruising at constant altitude, a "mission phase" in which the aircraft performs actions to complete an assigned mission and in which meeting high power demands on the aircraft 100 may be critical (e.g. to the success of the mission and/or the safety of the aircraft 100), a "descend phase" in which the aircraft 100 is descending in altitude, and a "landing phase" in which the aircraft is landing. In this embodiment, each template 126 specifies how, for the flight phase corresponding to that template 126, electrical power generation on the aircraft 100 is to be shared (i.e. proportioned) between the different on board electrical power generators (i.e. the engine driven power generator 104, the fuel cell 110, and the battery 114). Each template may specify a different respective proportioning or sharing of the electrical power generation between the different on board electrical power generators. Electrical power generation on board the aircraft 100 may be shared between the different on board electrical power generators in different proportions for different flight phases. For example, compared to the template 126 for the cruising phase, the template 126 for the take-off phase may specify that a reduced level of power is to be generated by the engine driven power generator 104 (so that less energy is drawn from the engine 102, and more of the mechanical power generated by the engine 102 may be used to generate thrust for the aircraft 100), and that the fuel cell 110 is to generate an increased amount of power to account for this reduction. In some embodiments, one or more of the templates 126 specify a power generation distribution for the on board electrical power generators in a different way instead of or in addition to a power generation sharing profile. For example, in some embodiments, a template 1126 may specify minimum and/or maximum electrical power generation amounts for one or more of the on board electrical power generators.

In some embodiments, multiple different templates 126, each specifying a different proportioning of the power generation between the power generators, may be specified for a given flight phase. Selection of a template 126 for the given flight phase from the multiple different templates corresponding to that flight phase may depend upon, for example, a measured aircraft state, environmental conditions, or any other appropriate factors.

In some embodiments, multiple different flight phases are associated with a common power sharing templates 126.

The fault detection module 120 is coupled to the engine 102. The fault detection module 120 is configured to detect that a fault with the engine 102 (for example, an engine failure) has occurred. The fault detection module 120 may be configured to detect one or more different types of engine faults. Engine faults (e.g. failures) may be detected in any appropriate way, for example including, but not limited to, a reduction in thrust generated by the engine 102 to or below a predetermined threshold value, or using measurements taken by one or more engine mounted sensors. The fault detection module 120 is coupled to the aircraft control module 122 such that, responsive to detecting a failure or fault with the engine 102, the fault detection module 120 may generate and send a fault signal to the aircraft control module 122. The fault signal may be an electrical signal indicative that an engine fault has occurred. The fault detection module 120 may be powered by electrical power supplied by the engine driven power generator 104, the fuel cell 110, and/or the battery 114.

The aircraft control module 122 comprises one or more processors. The aircraft control module 122 is coupled to the engine driven power generator 104 such that the aircraft control module 122 may control operation of the engine driven power generator 104, for example, to increase or decrease the electrical power generated by the engine driven power generator 104. The aircraft control module 122 is coupled to the battery 114 such that the aircraft control module 122 may control operation of the battery 114, for example, to increase or decrease the electrical power output by the engine battery 114. The aircraft control module 122 is configured to control the engine driven power generator 104, the fuel cell 110, and the battery 114 so as to change the proportions of the total generated electrical power (i.e. the total power produced by the engine driven power generator 104, the fuel cell 110, and the battery 114) that those individual systems produce. The aircraft control module 122 is coupled to the sensor systems 124 such that measurements taken by the sensor systems 124 may be received by the aircraft control module 122. The aircraft control module 122 is coupled to the aircraft subsystems 106 such that the aircraft control module 122 may control operation of the aircraft subsystems 106, e.g. the flight control surfaces 108, for example to control the flight of the aircraft 100. Control of the engine driven power generator 104, the fuel cell 110, the battery 114, and/or the aircraft subsystems 106 by the aircraft control module 122 may be initiated responsive to the aircraft control module 122 receiving a fault signal from the fault detection module 120. Control of the engine driven power generator 104, the fuel cell 110, the battery 114, and/or the aircraft subsystems 106 by the aircraft control module 122 may depend on measurements taken by the sensor systems 124. In this embodiment, the aircraft control module 122 is configured to determine a flight path for the aircraft 100 (e.g. using measurements from the sensor system 124) and to control the flight control surfaces 108 such that the aircraft 100 follows that determined flight path. The aircraft control module 122 may be powered by electrical power supplied by the engine driven power generator 104, the fuel cell 110, and/or the battery 114.

The sensor system 124 may include any appropriate aircraft-mounted sensors. In this embodiment, the sensor system 124 includes an altitude sensor, a velocity sensor, and a position sensor (e.g. a GPS receiver). In some embodiments, the sensor system 124 may include one or more sensors remote from the aircraft 100, e.g. a sensor located at a ground station.

Apparatus, including for example the power sharing module 116 and the aircraft control module 122, for implementing the above arrangement, and performing the method steps to be described later below, may be provided by configuring or adapting any suitable apparatus, for example one or more computers or other processing apparatus or processors, and/or providing other modules. The apparatus may comprise a computer, a network of computers, or one or more processors, for implementing instructions and using data, including instructions and data in the form of a computer program or plurality of computer programs stored in or on a machine readable storage medium such as a computer memory, a computer disk, ROM, PROM, etc., or any combination of these or other storage media. For example, in some embodiments, a common device or system, for example a common processor or group of processors, provides the functionality of multiple of the above mentioned modules. For example, the functionality of two or more of the power sharing module 116, the fault detection module 120, and aircraft control module 122 may be provided by a common device or system.

Figure 2:
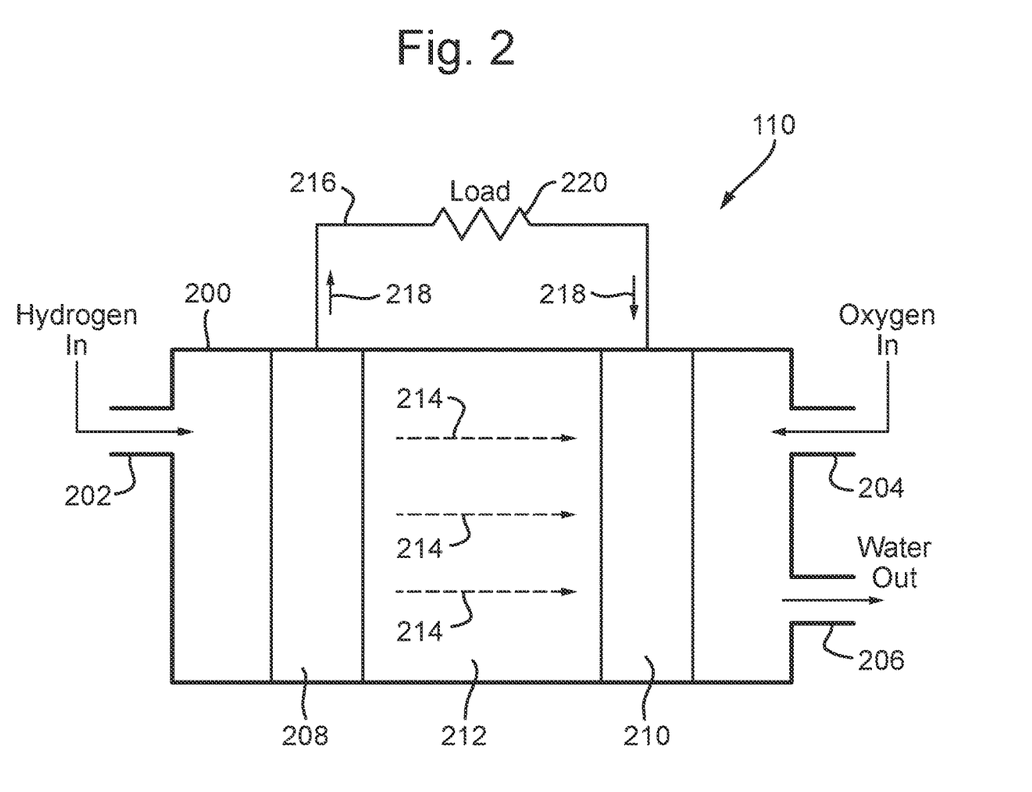
FIG. 2 is a schematic illustration (not to scale) of a fuel cell.

FIG. 2 is schematic illustration (not to scale) of the fuel cell 100.

In this embodiment, the fuel cell 110 is a Proton Exchange Membrane (PEM) fuel cell comprising a housing 200 having a first inlet 202, a second inlet 204, and an outlet 206. The fuel cell 110 further comprises, located within the housing 200, an anode 208, a cathode 210, and an electrolyte 212 disposed between the anode 208 and the cathode 210. The first inlet 202 is located at a first side of the fuel cell 110 at or proximate to the anode 208. The second inlet 204 is located at a second side of the fuel cell 110 at or proximate to the cathode 210, the second side of the fuel cell 110 being at an opposite side to the first side of the fuel cell 110. Thus, the anode 208, the cathode 210, and the electrolyte 212 are disposed between the first and second inlets 202, 204. The outlet 204 is located at the second side of the fuel cell 110

In this embodiment, the fuel cell 110 receives fuel cell fuel from the fuel cell fuel supply 112 at the first inlet 202 and the second inlet 204. In particular, hydrogen (in liquid or gas form) is received at the first inlet 202. Also, oxygen (e.g. contained in supplied air) is received at the second inlet. The anode 208 contains a catalyst that causes the received hydrogen fuel to dislocated into hydrogen ions (i.e. protons) and electrons. The hydrogen ions are drawn through the electrolyte 212 after the reaction, as indicated in FIG. 2 by dotted arrows and the reference numeral 214. At the same time, the electrons are drawn from the anode 208 to the cathode 210 through an external circuit 216, thereby producing direct current electricity. The flow of electrons through the external circuit 216 is indicated in FIG. 2 by solid arrows and the reference numeral 218. The external circuit 216 comprises a load 220 which in this embodiment includes inter alia the aircraft subsystems 106 and the engine 102. At the cathode 210, hydrogen ions, electrons, and oxygen react to form water which is expelled from the fuel cell 110 via the outlet 206.

Figure 3:
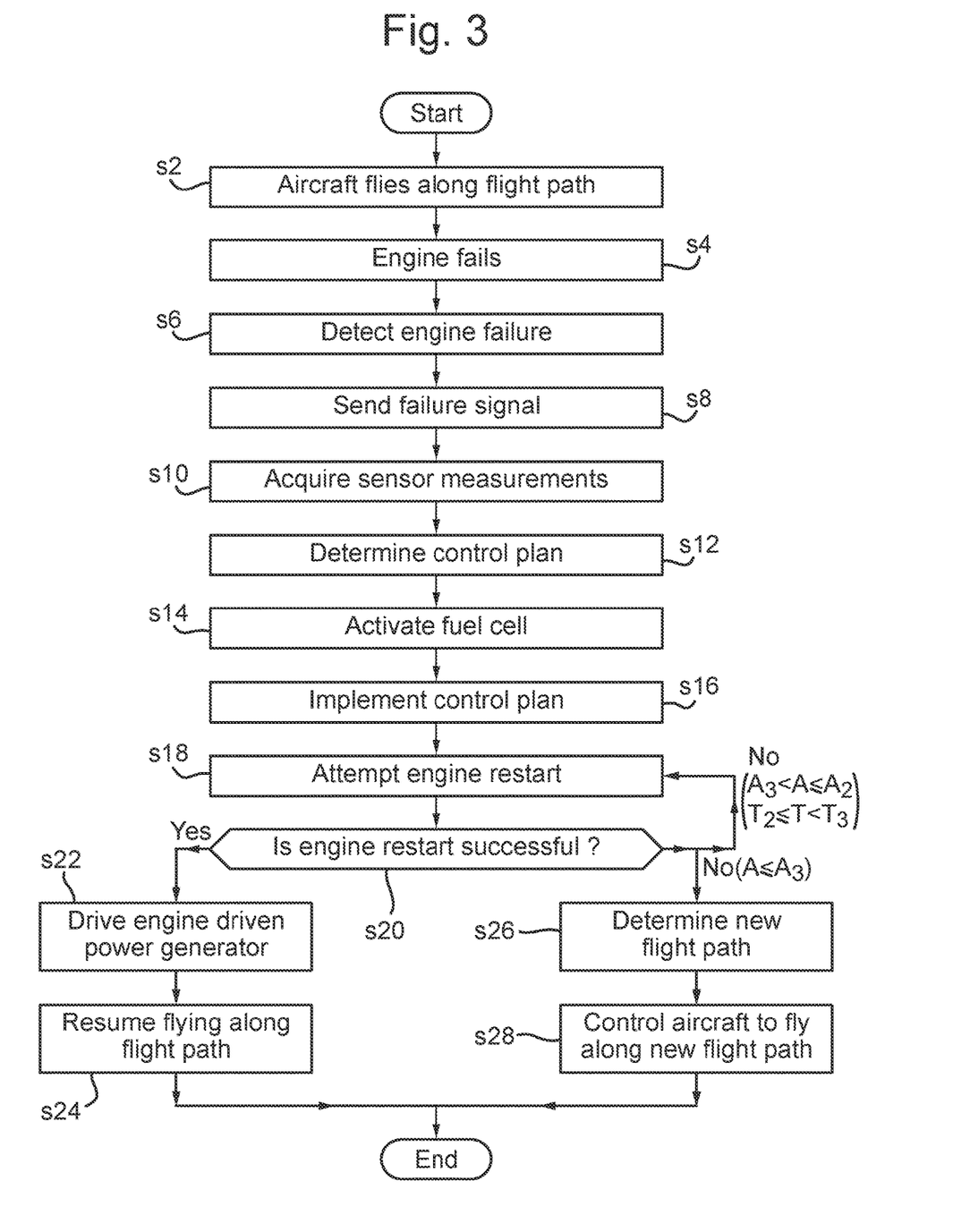
FIG. 3 is a process flow chart showing an embodiment of a method of operation of the aircraft.

FIG. 3 is a process flow chart showing an embodiment of a method of operation of the aircraft 100.

At step s2, the aircraft 100 flies along a predetermined initial flight path. While the aircraft 100 is in flight, the engine 102 drives the engine driven power generator 104. Also, the engine driven power generator 104 generates electrical power for controlling the aircraft 100, including controlling the aircraft flight control surfaces 108.

At step s4, at some point along the initial flight path, the engine 102 fails or develops a different type of fault.

Any appropriate fault of the engine 102 may occur. Examples of failure modes of the engine 102 include, but are not limited to an engine fire, a disc burst, a mechanical failure of the engine, a loss of engine control, a loss of fuel flow to the engine, an oil leak, a failure of an air induction system, and Foreign Object Debris (FOD) ingestion by the engine.

The engine fault may occur for any reason. Examples of events that could cause an engine fault include, but are not limited to, a bird-strike, a lightning strike, ingestions of foreign object debris (FOD), and a surge event.

In this embodiment, the fault with the engine 102 is an engine failure such that the engine 102 no longer provides propulsion for the aircraft 100. Also, the engine 102 no longer drives the engine driven power generator 104. Thus, the engine driven power generator 104 does not generate sufficient electricity to enable full control of the aircraft 100 by on board aircraft control systems.

In this embodiment, the failure or fault with the engine 102 is such that the engine 102 has to be restarted to enable the aircraft 100 to operate correctly.

At step s6, the fault detection module 120 detects that an engine fault (i.e. the engine failure) has occurred. For example, the fault detection module 120 may detect that the thrust produced by the engine 102 drops below a predetermined threshold value, and infer that a fault has occurred.

At step s8, the fault detection module 120 generates a fault signal and sends that generated fault signal to the aircraft control module 122. The fault signal is indicative that an engine fault has occurred. In some embodiments, the fault signal may specify a fault type.

At step s10, the aircraft control module 122 acquires sensor measurements taken by the sensor systems 124. In this embodiment, the aircraft control module 122 acquires measurements of at least the altitude of the aircraft 100.

At step s12, using the sensor measurements acquired at step s10, the aircraft control module 122 determines a plan for controlling the aircraft, hereinafter referred to as a "control plan".

In this embodiment, the control plan includes controlling the control surfaces 108 of the aircraft 100, for example so that the aircraft 100 glides in the direction of the flight path.

Also, in this embodiment, the control plan includes an "engine failure flight profile".

Figure 4:
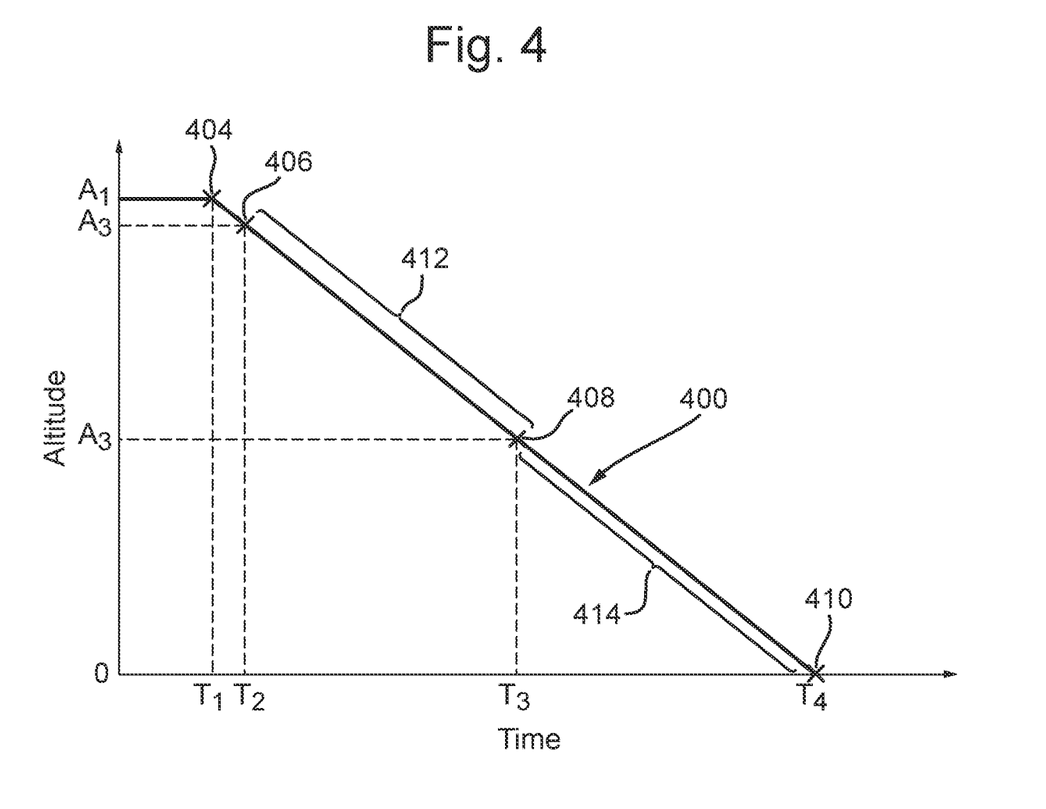
FIG. 4 is a schematic illustration (not to scale) showing an engine failure flight profile for the aircraft.

FIG. 4 is a schematic illustration (not to scale) showing an example of an engine failure flight profile 400 determined at step s12.

In this embodiment, the engine failure flight profile 400 is specified by a line on a graph having an x-axis representative of time, and a y-axis representative of aircraft altitude. The engine failure flight profile 400 is a flight profile for the aircraft 100 from its current altitude (as determined form the sensor measurements acquired at step s10) to the ground.

In this embodiment, the engine failure flight profile 400 comprises a plurality of events marked along the engine failure flight profile 400, namely a first event 404, a second event 406, a third event 408, and a fourth event 410.

The first event 404 is the detection of the engine failure. The first event 404 may correspond to the detection of the engine failure by the fault detection module 120 that occurred at step s6. In this embodiment, the first event 404 occurs when the aircraft 100 is at its cruising altitude $A_1$ and at a first time $T_1$.

In this embodiment, the cruising altitude $A_1$ is the current altitude of the aircraft 100. Also, the first time $T_1$ is the current time. In this embodiment, the second event 406, the third event 408, and the fourth event 410 are future events along the engine failure flight profile 400 that occur at respective future times when the aircraft 100 is at respective future altitudes. The positions of the events 404-410 along the engine failure flight profile 400 may be determined in any appropriate way.

The second event 406 is a start point of a period during which a restart of the engine 102 will be attempted, which period is hereinafter referred to as the "engine restart period" 412. In this embodiment, the second event 406 occurs when the aircraft 100 is at a second altitude $A_2$ and at a second time $T_2$. The second altitude $A_2$ is lower than the first altitude $A_1$. The second time $T_2$ is later than the first time $T_1$.

In this embodiment, the distance in time between the first event 404 and the second event 406 is representative of the lag time between detecting the engine fault failure event, and having power available (e.g. from the fuel cell 110 and/or the battery 114) to begin attempting to restart the engine 102. The distance in time between the first event 404 and the second event 406 may be a predetermined time period, or may be determined by the aircraft control module 122 using appropriate available data.

In some embodiments, between the first event 404 and the second event 406 is a period in which the aircraft subsystems 106 may be powered without the engine driven power generator 104 operating, for example by the fuel cell 110. A size of this period between the first and second events 404, 406 may be dictated by any engine restart altitude limitation there might be, such as a minimum altitude for attempting an engine restart.

The third event 408 is an end point of the engine restart period 412. In this embodiment, the distance along the engine failure flight profile 400 between the second event 406 and the third event 408 defines the engine restart period 412. In this embodiment, the third event 408 occurs when the aircraft 100 is at a third altitude $A_3$ and at a third time $T_3$. The third altitude $A_3$ is lower than the second altitude $A_2$. The third time $T_3$ is later than the second time $T_2$.

In some embodiments, the distance between the second event 406 and the third event 408 corresponds to a predetermined time period or altitude distance. In other words, the second event 406 and the third event 408 define an engine restart window, i.e. a window in which engine restart may be attempted. The window may be a temporal window (i.e. a window in the time domain) or a distance/altitude window. In some embodiments, the third event 408 is positioned at a predetermined time and/or altitude value on the engine failure flight profile 400. In some embodiments, the distance between the second event 406 and the third event 408 is determined by the aircraft control module 122 using appropriate available data, such as aircraft altitude measurements and/or the location of a safe landing site. For example, the aircraft control module 122 may, using the current position and altitude of the aircraft 100 and/or available environmental data, determine an amount of time the aircraft 100 would need to glide to a safe landing site. The position of the third event 408 along the engine failure flight profile 400 may then be determined such that the time distance between the third event 408 and the fourth event 410 is at least equal to the determined time to reach the safe landing site. This advantageously tends to provide that, if the engine 102 is not able to be restarted, it would be possible to control the aircraft 100 to glide to the safe landing site by using electrical power to control the aircraft flight surfaces 108 instead of attempting to restart the engine 102.

The fourth event 410 is a point at which the aircraft 100 contacts with the ground (i.e. lands or crashes). In this embodiment, the fourth event 410 occurs when the aircraft 100 is at an altitude of zero metres and at a fourth time $T_4$.

In this embodiment, the aircraft control module 122 constructs the engine failure flight profile 400 to correspond to a glide for maximum time in the air for the aircraft 100. However, in other embodiments, the engine failure flight profile 400 may be constructed in a different way, for example, to bring the aircraft 100 into contact with the ground in a shorter time, for example, if the aircraft 100 is close to a safe landing site when the engine failure occurs, or to maximise the distance that the aircraft 100 flies.

Thus, an example engine failure flight profile 400 is provided.

Returning now to the description of the process of FIG. 3, at step s14, the aircraft control module 122 activates the fuel cell 110 to begin generating electrical power. For example, the fuel cell 110 may be controlled to produce a maximum power output.

At step s16, the aircraft control module 122 controls the aircraft on board systems to implement the determined control plan.

In this embodiment, the aircraft control module 122 controls the control surfaces 108 of the aircraft 100 so that the aircraft 100 glides in the direction of the flight path. Also, in this embodiment, the aircraft control module 122 controls the aircraft on board systems in accordance with the determined engine failure flight profile 400.

The aircraft control module 122 may also control the fuel cell 110 and/or the battery 114 to supply power the aircraft subsystems 106 to meet, or attempt to meet, the power demand of the aircraft subsystems 106.

In particular, at step s18, when the second event 408 is reached (i.e. when the altitude of the aircraft 100 is equal to $A_2$, i.e. when the time is $T_2$), the aircraft control module 122 controls the fuel cell 110 to supply power to the engine 102 to attempt an engine restart. Thus, a restart of the engine 102 is attempted.

In this embodiment, engine restart attempts are only attempted when the aircraft 100 is between the second event 408 and the third event 410 on the engine failure flight profile 400.

At step s20, after each engine restart attempt, the aircraft control module 122 determines whether or not the engine 102 has been successfully restarted.

If, at step s20, the restart of the engine 102 is successful, the method proceeds to step s22.

If, at step s20, the restart of the engine 102 is unsuccessful, and if the aircraft 100 is between the second event 408 and the third event 410 on the engine failure flight profile 400 (i.e. if the altitude of the aircraft A is less than or equal to $A_2$ and greater than $A_3$, and/or if the current time T is greater than or equal to $T_2$ and less than $T_3$), the method returns to step s18. Thus, the aircraft control module 122 controls the fuel cell 110 and the engine 102 to attempt a further engine restart.

If, at step s20, the restart of the engine 102 is unsuccessful, and if the aircraft 100 is at or beyond the third event 410 on the engine failure flight profile 400 (i.e. if the altitude of the aircraft A is less than or equal to $A_3$, and/or if the current time T is greater than or equal to $T_3$), the method proceeds to step s26. Steps s26 and s28 will be described in more detail later below, after a description of steps s22 and s24.

At step s22, the engine 102 has been successfully restarted. Thus, the engine 102 provides thrust for the aircraft 100, and also drives the engine driven power generator 104. The engine driven power generator 104 provides generated electrical power to inter alia the aircraft subsystems 106.

At step s24, the aircraft control module 122 controls the aircraft 100 (including controlling the aircraft control surfaces 108) such that the aircraft 100 returns to, and travels along, the initial flight path. In other words, the aircraft 100 is returned to the flight path along which it was travelling before the engine failure occurred.

After step s24, the process of FIG. 3 ends.

Returning now to the case where the restarting of the engine 102 was unsuccessful and the aircraft 100 is at or after the third event 408 along the engine failure flight profile 400, at step s26, the aircraft control module 122 determines a new flight path for the aircraft 100.

Sensor measurements by the sensor systems 124 may be used to determine the new flight path, for example measurements of the aircraft's altitude, speed, heading, and position may be used. Other appropriate data may be used to determine the new flight path, for example, a location of a safe landing site which may be communicated to the aircraft 100, for example, from a ground station.

Preferably, the new flight path is a path along which the aircraft 100 may glide, from its current location to a safe landing site.

In some embodiments, the aircraft control module 122 determines that a safe landing site may not be reached. In such cases, the aircraft control module 122 may determine a flight path that minimises or eliminates a risk of damage to human life and/or property. For example, the aircraft control module 122 may acquire a location of an uninhabited/unoccupied site (e.g. a body of water) that is reachable by the aircraft 100, and determine the new flight path from the aircraft's current location to the uninhabited/unoccupied site.

In some embodiments, the aircraft control module 122 determines the new flight path from the aircraft's current location to a location that is easily reachable by ground crew, thereby facilitating recovery of the aircraft 100 after landing. The location that is easily reachable by ground crew may, for example, be determined by the aircraft control module 122, or be communicated to the aircraft control module 122 from the ground crew.

At step s28, the aircraft control module 122 controls the aircraft 100 (including controlling the aircraft control surfaces 108) such that the aircraft 100 flies along the new flight path, and land the aircraft 100. In this embodiment, electrical power supplied by the fuel cell 110 and/or the battery 114 is used to control the aircraft 100.

In this embodiment, further engine restarts are not attempted after the third event 410. This tends to provide that a maximum amount of electrical power from the fuel cell 110 and the battery 114 is available for controlling the gliding of the aircraft 100.

After step s28, the process of FIG. 3 ends.

Thus, an embodiment of a method of operation of the aircraft 100 is provided.

Figure 5:
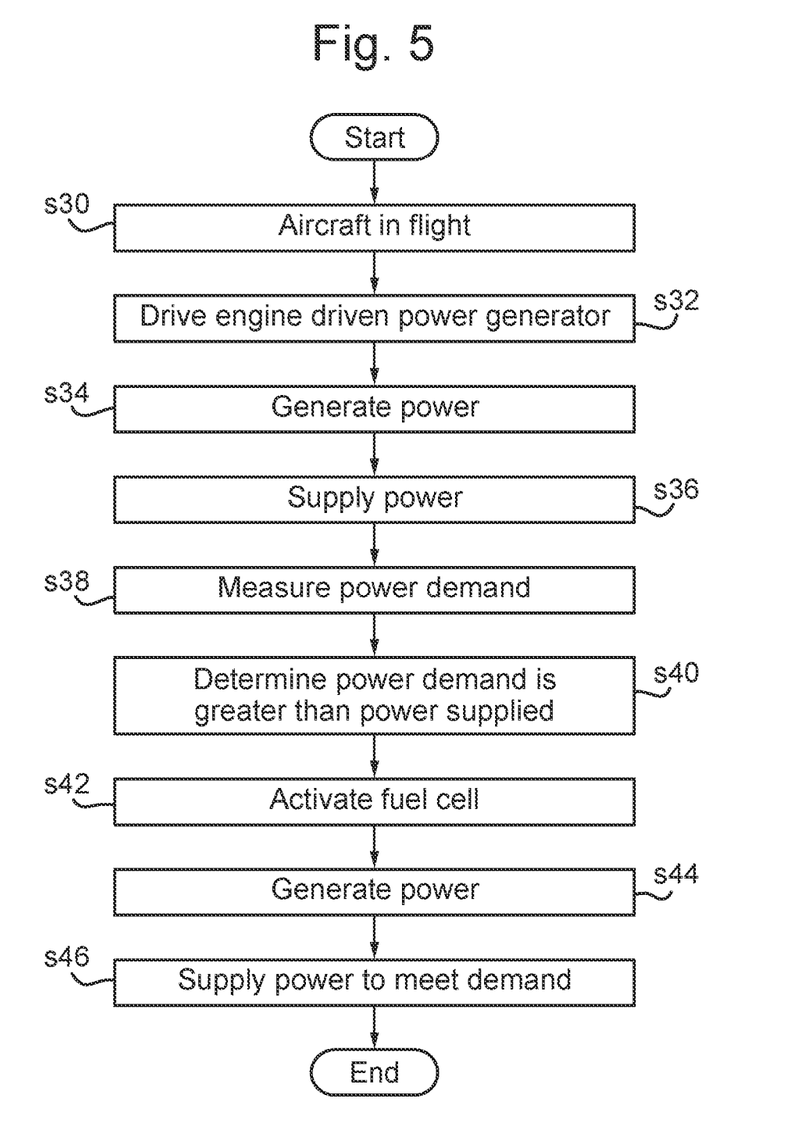
FIG. 5 is a process flow chart showing a further embodiment of a method of operation of the aircraft.

FIG. 5 is a process flow chart showing a further embodiment of a method of operation of the aircraft 100.

At step s30, the aircraft 100 is in flight.

At step s32, the engine 102 drives the engine driven power generator 104.

At step s34, the engine driven power generator 104 generates electrical power.

At step s36, the engine driven power generator 104 supplies the generated electrical power to the aircraft subsystems 106 for controlling the aircraft 100. For example, the engine driven power generator 104 supplies electrical power for actuating the flight control surfaces 108, e.g., under control of the aircraft control module 122.

At step s38, the power sharing module 116 determines a power demand placed on the engine driven power generator 104 by inter alia the aircraft subsystems 106.

In some embodiments, the total power demanded by power consumers on the aircraft 100 is measured by the power sharing module 116. In some embodiments, the respective power demands of each of the individual power consumers on the aircraft 100 are measured by the power sharing module 116.

In some embodiments, the power demand is measured continually and may be measured either continuously or periodically.

At step s40, the power sharing module 116 determines that the power demand placed on the engine driven power generator 104 is greater than the electrical power being supplied by the engine driven power generator 104.

In some embodiments, the power sharing module 116 determines that the engine driven power generator 104 does not meet the power demand in a different way other than by comparing the measured power demand and the amount of electrical power being supplied by the engine driven power generator 104. For example, the power sharing module 116 may determine that the engine driven power generator 104 does not meet the power demand by analysing the operation of the aircraft subsystems 106 to which power is supplied.

At step s42, responsive to determining that the power demanded by the on board aircraft systems is not being met by the engine driven power generator 104, the power sharing module 116 activates the fuel cell 110 to begin generating electrical power. For example, the fuel cell 110 may be controlled to produce a maximum power output.

In some embodiments, the fuel cell 110 may be activated responsive to a different event instead of or in addition to determining that that the power demanded by the on board aircraft systems is not being met by the engine driven power generator 104. For example, in some embodiments a power demand of the aircraft subsystems 106 may be measured or estimated prior to one or more of those subsystems 106 being turned on. Determining a power demand level before that level is demanded advantageously tends to allow for pre-planning of a mission and preparing other sources of power to come on-line when needed.

At step s44, the fuel cell 110 generates electrical power.

At step s46, the fuel cell 110 supplies the generated electrical power to the aircraft subsystems 106 for controlling the aircraft 100, thereby meeting the power demand of the aircraft subsystems 106.

Thus, a further embodiment of a method of operation of the aircraft 100 is provided.

Figure 6:
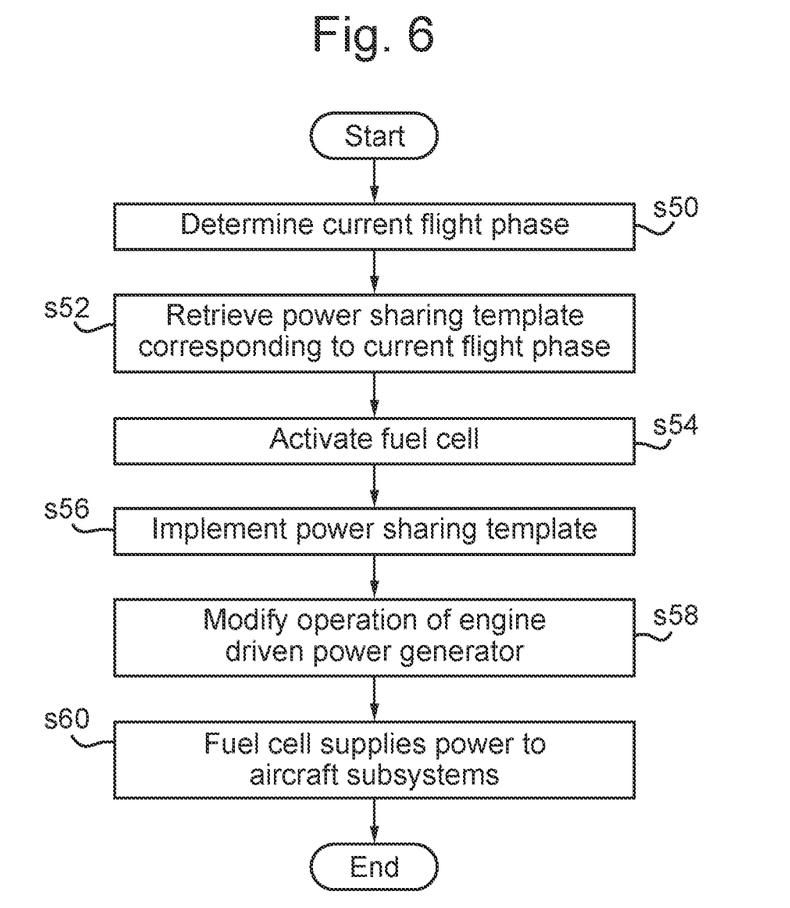
FIG. 6 is a process flow chart showing a second further embodiment of a method of operation of the aircraft.

FIG. 6 is a process flow chart showing a second further embodiment of a method of operation of the aircraft 100.

At step s50, the power sharing module 116 determines a current flight phase for the aircraft 100. The flight phase for the aircraft 100 may, for example, be determined based on a mission or flight profile for the aircraft 100.

By way of example, the aircraft 100 may be about to take-off, and thus the power sharing module 116 determines that the current flight phase for the aircraft 100 is in the "take-off phase".

At step s52, the power sharing module 116 retrieves, from the power sharing template store 118, the power sharing template 126 corresponding to the identified current flight phase.

Continuing the current example, the power sharing module 116 retrieves the "take-off phase" template 126 that specifies how the supply of electrical power to the aircraft subsystems 106 is to be distributed between the on board power generators during aircraft take-off.

At step s54, if the retrieved template 126 specifies that the fuel cell 110 is to supply electrical power, the power sharing module 116 activates the fuel cell 110 to begin generating electrical power. For example, the fuel cell 110 may be controlled to produce a maximum power output.

Continuing the current example, the "take-off phase" template 126 specifies that at least some electrical power is to be supplied by the fuel cell 110, and thus the power sharing module 116 activates the fuel cell 110.

At step s56, the power sharing module 116 controls the on board aircraft systems to implement the retrieved template 126.

In this embodiment, the power sharing module 116 controls the engine driven power generator 104, the fuel cell 110, and the battery 114 to generate and supply electrical power in accordance with the current retrieved template 126.

In particular, at step s58, the power sharing module 116 controls the engine driven power generator 104 to supply power in accordance with to the retrieved template 126.

Continuing the current example, the power sharing module 116 controls the engine driven power generator 104 in accordance with the "take-off phase" template 126 such that the engine driven power generator 104 generates and supplies a relatively low level of electrical power to the aircraft subsystems 106 (compared to the level supplied in other operating modes). Thus, the engine driven power generator 104 draws less energy from the engine 102, allowing more of the mechanical power generated by the engine 102 to be used for generating thrust for the aircraft 100 during take-off. In some embodiments, the "take-off phase" template 126 may specify that the engine driven power generator 104 is effectively disabled, thereby providing that the engine driven power generator 104 does not draw energy from the engine 102.

Also, at step s60, the power sharing module 116 controls the fuel cell 110 to supply power in accordance with to the retrieved template 126. The power sharing module 116 may also control the battery 114 to supply power in accordance with to the retrieved template 126.

Continuing the current example, the power sharing module 116 controls the fuel cell 110 in accordance with the "take-off phase" template 126 such that the fuel cell 110 generates and supplies a relatively high level of electrical power to the aircraft subsystems 106 (compared to the level supplied in other operating modes). In some embodiments, the electrical power generated by the fuel cell 110 may substantially meet the power demand of the aircraft subsystems 106, thereby providing that the engine driven power generator 104 can effectively be temporarily disabled so as not to draw energy from the engine 102 during take-off.

Thus, the power demand of the aircraft subsystems 106 during the current flight is met in with the relevant power sharing template 126.

The power sharing module 116 may continually, e.g. continuously, monitor which flight phase the aircraft 100 is operating in, and may select and implement the relevant power sharing template 126.

In some embodiments, the power sharing module 116 may be configured to determine whether or not the current power sharing template 126 can be overridden, i.e. whether or not power supply can be shared between the on board power generators in a way that is different to that specified by the current template 126. For example, the power sharing module 116 may determine that the current power sharing template 126 can be overridden if one or more criteria are satisfied. For example, the power sharing module 116 may determine that the current power sharing template 126 can be overridden if a power demand placed on the on board power generators cannot be met when conforming to the current template 126. In this case, the power sharing module 116 may control the on board power generators to supply electrical power to meet demand in a way that is not in accordance with the current template 126. Also for example, the power sharing module 116 may determine that the current power sharing template 126 can be overridden if an engine fault/failure has occurred.

Thus a second further embodiment of a method of operation of the aircraft 100 is provided.

It should be noted that certain of the process steps depicted in the flowcharts of FIGS. 3, 5 and 6 and described above may be omitted or such process steps may be performed in differing order to that presented above and shown in FIGS. 3, 5, and 6. Furthermore, although all of the process steps have, for convenience and ease of understanding, been depicted as discrete temporally-sequential steps, nevertheless some of the process steps may in fact be performed simultaneously or at least overlapping to some extent temporally.

It should be further noted that although, for convenience and ease of understanding, the processes depicted in the flowcharts of FIGS. 3, 5 and 6 are shown as separate independent processes, nevertheless two or more of the processes depicted in the flowcharts of FIGS. 3, 5 and 6 can be combined to form a single process. For example, in addition the using electricity generated by the fuel cell 110 to attempt an engine restart in the event of an engine failure, electricity generated by the fuel cell 110 may also by supplied to the aircraft subsystems 106 to meet a power demand of those aircraft subsystems 106.

An advantage provided by the above described system and method is that it tends to be possible to automatically restart the aircraft engine in the event of an engine failure. Engine restart tends to be performed in an efficient manner, while leaving enough time to control the aircraft to a safe destination in the event that the engine cannot be successfully restarted. This tends to be particularly useful for single engine aircraft, where there is no engine redundancy. Also, this tends to be particularly useful for aircraft that are especially prone to engine failure, for example aircraft operating in certain environments, such as airspace in which that is a relatively high density of particulate matter.

A further advantage provided by the above described system and method is that the electrical power demand of the on board aircraft subsystems tends to be met, even if an individual on board power generator is incapable of meeting demand on its own, and/or in the event of an engine failure or other system failure. Intelligent power sharing tends to provide that electrical systems on the aircraft may continue to operate correctly even in the event that power demand cannot be met by a primary generator. This tends to be particularly useful for "more electric aircraft" in which many aircraft subsystems, including the actuation of flight control surfaces, are powered by electricity.

A further advantage provided by the above described system and method is that the on board power generators tend to be controlled to supply electrical power to the on board aircraft subsystems in a way that is most appropriate for the aircraft's current operating mode or flight phase.

Use of a fuel cell and a battery to supply electrical power advantageously tend to lower aircraft emissions of, for example, carbon dioxide and nitrogen oxides.

The above described system and methods advantageously tend to facilitate the aircraft operating in accordance with various civil aviation regulations. For example, in the event of an engine fault of failure, the aircraft may be automatically controlled to land so as to avoid civilian areas.

A further advantage provided by the above described method and apparatus is that on board equipment tends to used in a way that reduces aircraft weight. For example, some aircraft include APUs that are only used while that aircraft is on the ground. These aircraft are therefore carrying extra weight that provides no in-flight benefit. The above described method and apparatus tends to use all sources of power on the aircraft to improve the size of equipment for on ground and flight use.

In the above embodiment, the above described system is implemented on board an aircraft. However, in other embodiments, the system is implemented on a different type of vehicle, such as a land-based or water-based vehicle. In some embodiments, the system is distributed across multiple different vehicles or other entities, such as over multiple aircraft.

In the above embodiment, there is a single engine, a single engine driven power generator, a single fuel cell, a single fuel cell fuel supply, and a single battery on the aircraft. However, in other embodiments, the aircraft comprises multiple engines, multiple engine driven power generators, multiple fuel cells, multiple fuel cell fuel supplies, and/or multiple batteries.

In the above embodiments, the aircraft comprises an engine driven power generator, a fuel cell, and a battery. However, in other embodiments, the aircraft comprises one or more different type of electrical power generators or energy storage devices instead of or in addition to one or more of the power generator, a fuel cell, and a battery. For example, in some embodiments, the aircraft comprises one or more solar panels, one or more APUs, one or more alternators, one or more hydraulic motors, and/or one or more ram air turbines (RATs).

In the above embodiments, the aircraft comprises a battery. However, in other embodiments, the aircraft may include one or more different types of energy storage device instead of or in addition to the battery, for example, a supercapacitor.

In the above embodiments, the fuel cell is a PEM fuel cell. However, in other embodiments, the fuel cell is a different type of fuel cell, for example a Solid Oxide Fuel Cell (SOFC).

In the above embodiments, the fault detection module is configured to detect a failure or fault with the engine. However, in other embodiments, the fault detection module is configured to detect a failure or fault with one or more different aircraft subsystems instead of or in addition to the engine. A restart of the one or more different subsystems of which a failure is detected may be attempted in a similar fashion to the restart of the engine as described in more detail earlier above.

In the above embodiments, different power sharing schedule for the on board power generators/supplies are specified by the power sharing templates. However, in other embodiments, how power supply is shared between the different power supplies may be specified in a different way. For example, in some embodiments, the power sharing module may determine how power supply should be proportioned between the on board power generators when the aircraft starts a new flight phase. How power supply is distributed between the on board power generators may be determined, for example based on the current flight phase of the aircraft, operating parameters (e.g. a power output) of one or more of the on board power generators, power demand levels of the aircraft subsystems, and/or measurements taken by the sensor system.

In the above embodiments, the control plan, including the engine failure flight profile, is determined in response to the detection of an engine failure/fault. However, in other embodiments, the control plan is determined not in response to the detection of an engine failure/fault. For example, the control plan could be determined, and may also be continually updated, prior to the detection of a fault. This tends to provide that an appropriate control plan is available immediately upon detection of a fault/failure or other event.

In the above embodiments, the determination of the control plan includes determination of the engine restart period. However, in other embodiments, no engine restart period is determined. For example, in some embodiments, an engine restart is not attempted if the aircraft does not have sufficient altitude (e.g. if the altitude of the aircraft is below a threshold value), or if the type of fault/failure that occurs means that an engine restart is not possible.

In the above embodiments, if a power demand of the aircraft subsystems is not met by engine driven power generator, the fuel cell and/or the battery are controlled to meet the power demand. However, in some embodiments, the total power demand of the aircraft subsystems exceeds the maximum power output of the aircraft's primary electrical power source and all of the aircraft's auxiliary power supplies. The aircraft may include one or more modules for acquiring (such as determining) a priority order for the aircraft subsystems in which power is to be supplied. Thus, in the event that the electrical power demand of the aircraft subsystems cannot be met by the on board power generators, the available electrical power is supplied to the most important aircraft subsystems first. In some embodiments, the available electrical power on the aircraft may be supplied to sequentially power each aircraft function for a predetermined time period. Thus, power on the aircraft could be used to power all aircraft functions for short periods of time. These short periods of time may be non-overlapping, or may partially or completely overlap.

In the above embodiments, the fuel cell is activated in response to a certain event, e.g. responsive to the detection of an engine fault/failure or responsive to a determination that a power demand level exceeds a power output of the aircraft's primary power generator (i.e. the engine driven power generator). However, in other embodiments the fuel cell is activated in response to a different event. For example, in some embodiments the fuel cell is always activated so that electrical power tends to be always available. Excess generated electricity may be stored or wasted. In some embodiments, the fuel cell may be activated prior to the aircraft embarking on a certain flight phase, e.g. prior to the "climb phase" so that energy from the engine may be diverted from driving the engine driven power generator to providing more thrust for the aircraft. In some embodiments, the fuel cell operates in normal high demand conditions, and may increase power output, for example, in the case of an engine failure.

In some embodiments, certain events cause very steep increases in power demand. For example, an engine failure may cause a substantially instantaneous increase in power demand, as additional electrical power is substantially instantly demanded to effect an engine restart. Also, in some embodiments, when the fuel cell (or other auxiliary power supply) is activated, there may be a finite time period between activation of the fuel cell and the fuel cell outputting a desired power level. Thus, in some embodiments there may be a finite time period between after activation of an auxiliary power supply in which the on board power supplies do not meet the power demand placed on them. In some embodiments, the battery or other energy storage device may be controlled to quickly meet very steep increases in power demand.

Figure 7:
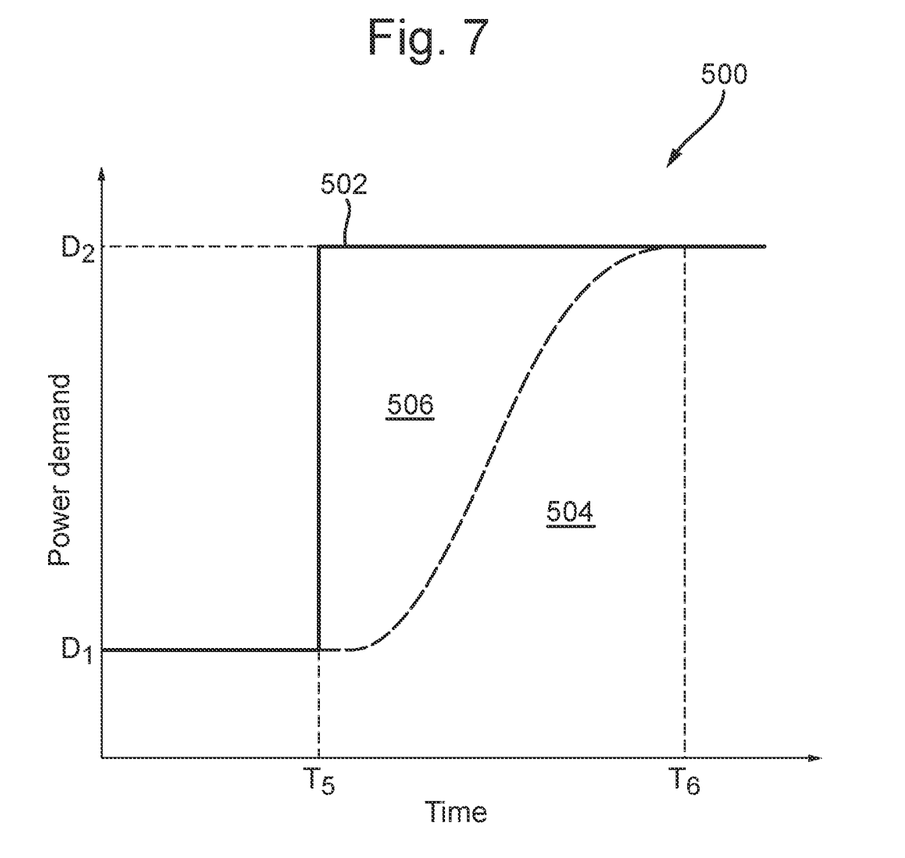
FIG. 7 is a schematic illustration (not to scale) showing an example load profile for power supplies on the aircraft.

FIG. 7 is a schematic illustration (not to scale) showing graph 500 that includes an example load profile 502 for the fuel cell 110.

An x-axis of the graph 500 is representative of time. A y-axis of the graph 500 is representative of a power demand placed on the fuel cell 110.

In this embodiment, the power demand placed on the fuel cell 110 by the aircraft subsystems 106 increases from a lower first demand value $D_1$ to a higher second demand value $D_2$ at a fifth time $T_5$. This increase in power demand may, for example, result from an engine fault.

In this embodiment, at the fifth time $T_5$ the fuel cell 110 is "activated" i.e. controlled (e.g. by the power sharing module 116 or the aircraft control module 122) to increase its power output from the first demand value $D_1$ to the second demand value $D_2$. The power output of the fuel cell 110 is shown in FIG. 7 by an area under a dotted line and is indicated by the reference numeral 504. In this embodiment, the power output of the fuel cell 110 reaches the second demand value $D_2$ at a sixth time $T_6$.

In this embodiment, the battery 114 is controlled (e.g. by the power sharing module 116 or the aircraft control module 122) to supply electrical power to the aircraft subsystems 106 to meet the substantially instantaneous high power demand that occurs at the fifth time $T_5$. The power output of the battery 114 is shown in FIG. 7 by an area between the load profile 502 and the dotted line, and is indicated by the reference numeral 506.

Thus, advantageously, the battery 114, or other energy storage devices, may be operated to rapidly discharge so as to rapidly provide increased power levels for relatively short periods of time, for example, to meet step increases in power demand placed on an electrical power generator. Thus, the battery 114 may be controlled to account for relatively slow increases in power output of one or more other auxiliary power supplies on the aircraft 100.

What is claimed is:

1. A vehicle comprising:
    an engine;
    an engine driven electrical power generator configured to be driven by the engine;
    a non-regenerative fuel cell;
    an energy storage device, the energy storage device being a different device to the fuel cell and the engine driven electrical power generator;
    one or more vehicle subsystems;
    a memory storing a plurality of different power sharing templates, each power sharing template specifying different power supply sharing information; and
    a controller configured to:
        select a power sharing template from the plurality of power sharing templates;
        control the engine driven electrical power generator and the fuel cell to supply electrical power to the one or more vehicle subsystems such that said supply of electrical power is proportioned between the engine driven electrical power generator and the fuel cell in accordance with the power supply sharing information specified in the selected power sharing template; and
        responsive to determining that one or more predetermined criteria are met, control the energy storage device to discharge and supply at least some electrical power to the one or more vehicle subsystems while an electrical power output of the fuel cell is increasing.

2. The vehicle according to claim 1, wherein:
    each of the power sharing templates corresponds to a respective operation phase for the vehicle; and
    the controller is further configured to:
        determine a current operation phase for the vehicle from a plurality of different possible operation phases; and
        select a power sharing template from the plurality of power sharing templates based on the determined current operation phase.

3. The vehicle according to claim 2, wherein:
    the vehicle is an aircraft; and
    the possible operation phases are flight phases for the aircraft.

4. The vehicle according to claim 1, wherein the controller is configured to, responsive to determining that one or more predetermined criteria are met, override the selected power sharing template and control the engine driven electrical power generator and the fuel cell to supply electrical power to the one or more vehicle subsystems such that said supply of electrical power is proportioned between the engine driven electrical power generator and the fuel cell in a different way to that specified in the selected power sharing template.

5. The vehicle according to claim 1, wherein the controller is configured to, responsive to determining that one or more predetermined criteria are met, control the fuel cell to increase an amount of electrical power supplied to the one or more vehicle subsystems by the fuel cell.

6. The vehicle according to claim 1, wherein the energy storage device is an energy storage device selected from the group of energy storage devices consisting of a battery and a supercapacitor.

7. The vehicle according to claim 4, wherein the one or more predetermined criteria are selected from the group of criteria consisting of:
    a criterion that the controller acquires an indication that a fault with or failure of the engine has occurred; a criterion that the controller acquires an indication that an electrical power demand of the one or more vehicle subsystems has increased;
    a criterion that the controller acquires an indication that an electrical power demand of the one or more vehicle subsystems will increase at a future time step; and
    a criterion that the controller acquires an indication that an electrical power demand of the one or more vehicle subsystems exceeds an electrical power output of the engine driven electrical power generator.

8. The vehicle according to claim 1, wherein:
the vehicle further comprises a fault detection module; and
the controller is configured to, responsive to the fault detection module detecting a fault occurring with the engine, control the fuel cell to provide an increased level of electrical power to the one or more vehicle subsystems.

9. The vehicle according to claim 8, wherein:
the vehicle further comprises a system for starting the engine; and
the controller is configured to, responsive to the fault detection module detecting a fault occurring with the engine, control the fuel cell to provide electrical power to the system for starting the engine, and control the system for starting the engine to attempt to start the engine using the supplied electrical power.

10. The vehicle according to claim 1, wherein the fuel cell is a fuel cell selected from the group of fuel cells consisting of a Proton Exchange Membrane fuel cell and a Solid Oxide Fuel cell.

11. A vehicle according to claim 1, wherein the vehicle is an aircraft.

12. A method of supplying electrical power to one or more vehicle subsystems on a vehicle, the method comprising:
providing, on the vehicle, an engine driven electrical power generator configured to be driven by an engine of the vehicle;
providing, on the vehicle, a fuel cell;
providing, on the vehicle, an energy storage device, the energy storage device being a different device to the fuel cell and the engine driven electrical power generator;
selecting a power sharing template from a plurality of power sharing templates stored in a memory on the vehicle, each of the power sharing templates specifying different power supply sharing information;
controlling the engine driven electrical power generator and the fuel cell to supply electrical power to the one or more subsystems of the vehicle such that said supply of electrical power is proportioned between the engine driven electrical power generator and the fuel cell in accordance with the power supply sharing information specified in the selected power sharing template; and
responsive to determining that one or more predetermined criteria are met, controlling the energy storage device to discharge and supply at least some electrical power to the one or more vehicle subsystems while an electrical power output of the fuel cell is increasing.

13. The method according to claim 12, wherein:
each power sharing template corresponds to a respective operation phase for the vehicle; and
the step of selecting comprises:
determining a current operation phase for the vehicle from a plurality of different possible operation phases; and
selecting a power sharing template from the plurality of power sharing templates based on the determined current operation phase.

* * * * *